United States Patent [19]
Hoff et al.

[11] Patent Number: 5,879,494
[45] Date of Patent: Mar. 9, 1999

[54] METHOD OF APERTURING THIN SHEET MATERIALS

[75] Inventors: Randy A. Hoff, Hudson; John W. Louks, North Hudson, both of Wis.; Richard L. Jacobson, Oakdale, Minn.

[73] Assignee: Minnesota Mining and Manufacturing Company, St. Paul, Minn.

[21] Appl. No.: 45,606

[22] Filed: Mar. 20, 1998

Related U.S. Application Data

[63] Continuation of Ser. No. 692,035, Sep. 23, 1996, Pat. No. 5,735,984.

[51] Int. Cl.$^6$ ............................................. B32B 31/18
[52] U.S. Cl. .................... 156/73.3; 156/253; 156/268; 156/580.2; 264/444; 83/956
[58] Field of Search ................... 156/73.1, 73.2, 156/73.3, 252, 253, 268, 580.1, 580.2; 83/956, 30, 660; 264/442, 443, 444, 445

[56] References Cited

U.S. PATENT DOCUMENTS

| | | | |
|---|---|---|---|
| 2,647,065 | 7/1953 | Scholl | 117/4 |
| 2,712,159 | 7/1955 | Marsch | 18/42 |
| 2,748,863 | 6/1956 | Benton | 164/99 |
| 2,924,863 | 2/1960 | Chavannes | 22/203 |
| 3,073,304 | 1/1963 | Schaar | 128/156 |
| 3,085,024 | 4/1963 | Blackford | 117/4 |
| 3,307,545 | 3/1967 | Surowitz | 128/156 |
| 3,355,974 | 12/1967 | Carmichael | 83/171 |
| 3,457,132 | 7/1969 | Tuma et al. | 156/515 |
| 3,459,610 | 8/1969 | Dijkers et al. | 156/73 |
| 3,562,041 | 2/1971 | Robertson | 156/73 |
| 3,566,726 | 3/1971 | Politis | 83/15 |
| 3,575,752 | 4/1971 | Carpenter | 156/73 |
| 3,595,453 | 7/1971 | Sherry | 225/1 |
| 3,655,491 | 4/1972 | Dyke | 156/459 |
| 3,660,186 | 5/1972 | Sager et al. | 156/73 |
| 3,683,736 | 8/1972 | Loose | 83/16 |
| 3,697,357 | 10/1972 | Obeda | 156/510 |
| 3,718,059 | 2/1973 | Clayton | 83/2 |
| 3,733,238 | 5/1973 | Long et al. | 156/580 |

(List continued on next page.)

FOREIGN PATENT DOCUMENTS

| | | |
|---|---|---|
| 0 347 746 A1 | 12/1989 | European Pat. Off. . |
| 0 549 357 A1 | 6/1993 | European Pat. Off. . |
| 2118931 | 4/1972 | France . |
| 25 34 376 | 2/1977 | Germany . |
| 58-131026 | 4/1983 | Japan . |
| 2 066 143 A | 7/1981 | United Kingdom . |
| 2 124 134 | 2/1984 | United Kingdom . |
| WO 90/00110 | 1/1990 | WIPO . |
| WO 93/15701 | 8/1993 | WIPO . |
| WO 96/19313 | 6/1996 | WIPO . |
| WO 96/35499 | 11/1996 | WIPO . |
| WO 97/09013 | 3/1997 | WIPO . |
| WO 97/09017 | 3/1997 | WIPO . |
| WO 97/09018 | 3/1997 | WIPO . |
| WO 97/09020 | 3/1997 | WIPO . |
| WO 97/11661 | 4/1997 | WIPO . |
| WO 97/11662 | 4/1997 | WIPO . |
| WO 97/22434 | 6/1997 | WIPO . |
| WO 97/38832 | 10/1997 | WIPO . |
| WO 98/10726 | 3/1998 | WIPO . |

*Primary Examiner*—James Sells
*Attorney, Agent, or Firm*—Robert W. Sprague; Stephen W. Bauer; Ann M. Mueting

[57] ABSTRACT

A method of forming apertures generally greater than about 0.05 square millimeters in a thin sheet material. The thin sheet material includes a first side and a second side at least one side of the thin sheet material is substantially coated with an adhesive. The method comprises the steps of (a) placing the adhesive-coated thin sheet material on a patterned anvil having a pattern of raised areas wherein the height of the raised areas is equal to or less than the thickness of the thin sheet material and the adhesive; and (b) subjecting the thin sheet material to a sufficient amount of sonic vibrations to aperture the thin sheet material and the adhesive; and whereby the thin sheet material and the adhesive is apertured in a pattern generally the same as the pattern of raised areas on the patterned anvil.

38 Claims, 2 Drawing Sheets

U.S. PATENT DOCUMENTS

| | | | |
|---|---|---|---|
| 3,756,880 | 9/1973 | Graczyk | 156/73 |
| 3,756,889 | 9/1973 | Wolfberg et al. | 156/253 |
| 3,844,869 | 10/1974 | Rust, Jr. | 156/358 |
| 3,879,256 | 4/1975 | Rust, Jr. | 156/580 |
| 3,927,669 | 12/1975 | Glatt | 128/156 |
| 3,929,135 | 12/1975 | Thompson | 128/287 |
| 3,939,033 | 2/1976 | Grgach et al. | 156/515 |
| 3,949,127 | 4/1976 | Ostermeier et al. | 428/137 |
| 3,966,519 | 6/1976 | Mitchell et al. | 156/73.1 |
| 4,051,848 | 10/1977 | Levine | 128/156 |
| 4,081,580 | 3/1978 | Kato | 428/134 |
| 4,109,353 | 8/1978 | Mitchell et al. | 28/104 |
| 4,132,519 | 1/1979 | Reed | 435/174.2 |
| 4,149,288 | 4/1979 | Sendor et al. | 11/1 |
| 4,151,240 | 4/1979 | Lucas et al. | 264/504 |
| 4,157,719 | 6/1979 | DeWoskin | 128/291 |
| 4,272,473 | 6/1981 | Riemersma et al. | 264/154 |
| 4,311,540 | 1/1982 | Hill | 156/73.1 |
| 4,319,868 | 3/1982 | Riemersma et al. | 425/290 |
| 4,324,246 | 4/1982 | Mullane et al. | 128/287 |
| 4,326,909 | 4/1982 | Slavik | 156/253 |
| 4,342,314 | 8/1982 | Radel et al. | 128/287 |
| 4,400,227 | 8/1983 | Riemersma | 156/73.1 |
| 4,406,720 | 9/1983 | Wang et al. | 156/73.2 |
| 4,414,045 | 11/1983 | Wang et al. | 156/73.2 |
| 4,426,242 | 1/1984 | Sarkans et al. | 156/252 |
| 4,430,148 | 2/1984 | Schaefer | 156/580.2 |
| 4,463,045 | 7/1984 | Ahr et al. | 428/131 |
| 4,500,372 | 2/1985 | Mion | 156/73.3 |
| 4,541,426 | 9/1985 | Webster | 128/156 |
| 4,554,317 | 11/1985 | Behar et al. | 525/28 |
| 4,560,427 | 12/1985 | Flood | 156/73.3 |
| 4,591,523 | 5/1986 | Thompson | 428/131 |
| 4,605,454 | 8/1986 | Sayovitz et al. | 156/73.1 |
| 4,657,006 | 4/1987 | Rawlings et al. | 128/156 |
| 4,664,662 | 5/1987 | Webster | 604/369 |
| 4,670,089 | 6/1987 | Hanson | 156/629 |
| 4,686,137 | 8/1987 | Ward, Jr. et al. | 428/290 |
| 4,690,722 | 9/1987 | Flood | 156/510 |
| 4,747,895 | 5/1988 | Wallerstein et al. | 156/73.3 |
| 4,758,297 | 7/1988 | Calligarich | 156/251 |
| 4,859,519 | 8/1989 | Cabe, Jr. et al. | 428/131 |
| 4,867,150 | 9/1989 | Gilbert | 128/155 |
| 4,935,087 | 6/1990 | Gilman | 156/251 |
| 5,006,394 | 4/1991 | Baird | 428/138 |
| 5,055,152 | 10/1991 | Inagaki | 156/244.11 |
| 5,061,331 | 10/1991 | Gute | 156/64 |
| 5,089,075 | 2/1992 | Sonoda | 156/244.18 |
| 5,223,319 | 6/1993 | Cotton et al. | 428/131 |
| 5,223,329 | 6/1993 | Amann | 428/198 |
| 5,269,981 | 12/1993 | Jameson et al. | 264/23 |
| 5,296,291 | 3/1994 | Mueller | 428/349 |
| 5,336,452 | 8/1994 | Cohen et al. | 264/23 |
| 5,370,764 | 12/1994 | Alikhan | 156/553 |
| 5,549,777 | 8/1996 | Langdon et al. | 156/244.18 |
| 5,560,794 | 10/1996 | Currie et al. | 156/73.2 |
| 5,567,376 | 10/1996 | Turi et al. | 264/455 |
| 5,658,639 | 8/1997 | Curro et al. | 428/131 |
| 5,665,452 | 9/1997 | Langdon et al. | 428/131 |
| 5,714,107 | 2/1998 | Levy et al. | 264/289 |
| 5,733,626 | 3/1998 | Middletohn | 428/131 |
| 5,733,628 | 3/1998 | Pelkie | 428/138 |
| 5,735,984 | 4/1998 | Hoff et al. | 156/73.3 |

METHOD OF APERTURING THIN SHEET MATERIALS

This application is a continuation of U.S. application Ser. No. 08/692,035 (filed Sep. 23, 1996), now issued as U.S. Pat. No. 5,735,984.

FIELD OF THE INVENTION

The invention relates to methods for aperturing thin sheet materials in a generally uniform pattern.

BACKGROUND OF THE INVENTION

Ultrasonics is basically the science of the effects of sound vibrations beyond the limit of audible frequencies. The object of high power ultrasonic applications is to bring about some permanent physical change in the material treated. This process requires the flow of vibratory energy per unit of area or volume. Depending on the application, the resulting power density may range from less than a watt to thousands of watts per square centimeter. Although the original ultrasonic power devices operated at radio frequencies, today most operate at 20–69 kHz.

Ultrasonics is used in a wide variety of applications. For example, ultrasonics is used for (1) dust, smoke and mist precipitation; (2) preparation of colloidal dispersions; (3) cleaning of metal parts and fabrics; (4) friction welding; (5) the formation of catalysts; (6) the degassing and solidification of molten metals; (7) the extraction of flavor oils in brewing; (8) electroplating; (9) drilling hard materials; (10) fluxless soldering and (11) nondestructive testing such as in diagnostic medicine.

Ultrasonic vibratory forces have also been used in the areas of welding textile sheet materials. U.S. Pat. No. 3,697,357 to Obeda discloses welding sheets made entirely or partially of thermoplastic material or fiber. Obeda discloses sealing an area of material by placing it between an anvil and an ultrasonic horn. U.S. Pat. No. 3,939,033 to Grgach discloses an ultrasonic apparatus for the simultaneous sealing and cutting of thermoplastic textile material. U.S. Pat. No. 5,061,331 to Gute discloses another ultrasonic cutting and edge sealing apparatus suitable for cutting and sealing semipermeable and at least partially thermoplastic fabric.

Ultrasonic vibratory force has also been used to perforate or aperture sheet materials. U.S. Pat. No. 3,966,519 to Mitchell et al. discloses a method of aperturing nonwoven webs. Mitchell teaches that the amount of ultrasonic energy to which a nonwoven web is subjected can be controlled by applying enough of a fluid to the area at which the ultrasonic energy is applied to the nonwoven web so that the fluid is present in uncombined form. Mitchell teaches that the fibers of the nonwoven web rearrange to form apertures in the web.

U.S. Pat. No. 3,949,127 to Ostermeier discloses a method of aperturing nonwoven webs by submitting the web to intermittent ultrasonic fusion and then stretching the web to break the most intensely fused regions causing perforations to form in the web.

Ultrasonic force has also been used to aperture nonporous film material. U.S. Pat. No. 5,269,981 to Jameson, et al. discloses a method of microaperturing thin sheet material which requires applying a liquid to the thin film before subjecting it to ultrasonic vibrations. Jameson further discloses that inclusion of the liquid in the process is essential. Without the liquid, Jameson teaches, that the process is not successful because the thin film is melted without aperturing the film. Jameson teaches that it is believed that the presence of the fluid during operation of the ultrasonic horn accomplishes two separate and distinct functions. First, the presence of the fluid allows the fluid to act as a heat sink which allows the ultrasonic vibrations to be applied to the thin sheet material without the thin sheet material being altered or destroyed by melting. Second, the presence of the fluid allows the fluid to act as a coupling agent in applying the vibrations from the ultrasonic horn to the thin sheet material.

Aperturing thin sheets using ultrasonics is desirable because it allows rapid movement of the thin sheet through the process without creating waste. In the past, methods used to aperture thin sheets have included punching the sheet material. Although punching the aperture out of the sheet material created the desired perforated effect, punching left behind residual waste in the form of cores. The cores often adhered to the thin sheet material and produced an undesirable effect because they interfered with manufacturing of the final product.

Another method of aperturing thin sheets included passing the thin sheet material through a patterned heated roller. This method ultimately melted the apertures into the thin sheet material resulting in an adequately apertured material without additional waste adhering to the thin sheet. Even though it overcame the problems caused by punching the thin sheet, the heated roller method was a slow process. In the nip created between the heated roller and the patterned anvil, the thin sheet material was heated and the apertures were formed in the thin sheet material. The thin sheet material was then cooled to prevent the apertures from melting back together. All of these heating, forming and cooling processes took time and it was required that these processes take place in the narrow area of the nip. Thus, the process proceeded relatively slowly and this method was not a viable method of aperturing thin sheets.

A method of aperturing thin sheet materials is needed which is relatively rapid compared to the heated roller method and is relatively waste-free as compared to the punching method. A method of perforating webs which utilizes ultrasonics overcomes the shortcomings of the previous perforating methods. The present invention uses ultrasonics to perforate webs and obviates the need to stretch the web and also obviates the need to use liquid in combination with the ultrasonic vibrations.

SUMMARY OF THE INVENTION

In response to the forgoing problems and difficulties encountered by those in the art, we have developed, in brief summary, a method for forming apertures in a sheet material having a thickness of about 8 (eight) mils (0.2 mm) or greater where the area of each of the formed apertures is generally greater than about 0.05 square millimeters. The method includes the steps of: supplying a thin sheet material having a first side and a second side wherein at least one side of the thin sheet material is substantially coated with an adhesive, the aperturing method comprises the steps of: (a) placing the adhesive-coated thin sheet material on a patterned anvil having a pattern of raised areas wherein the height of the raised areas is equal to or less than the thickness of the thin sheet material and the adhesive; and (b) subjecting the thin sheet material to a sufficient amount of sonic vibrations having at least about 10,000 cycles per second to aperture the thin sheet material and the adhesive, and whereby the thin sheet material and the adhesive is apertured in a pattern generally the same as the pattern of raised areas on the patterned anvil and wherein the area of each of the formed apertures is generally greater than about 0.05 square millimeters.

In another embodiment the invention includes a method of aperturing a thin sheet material by providing a thin sheet material having a first surface and a second surface wherein at least one surface of the thin sheet material is in planar juxtaposition with a liner and an adhesive is optionally coated on the thin sheet material, the thin sheet material and the liner and the optional adhesive together comprising a composite sheet material, the method of aperturing the thin sheet material and the optional adhesive comprising the steps of: (a) placing the composite sheet material on a patterned anvil having a pattern of raised areas where the height of the raised areas is equal to or less than the thickness of the thin sheet material and the optional adhesive; and (b) subjecting the composite sheet material to sonic vibrations having vibrations of at least about 10,000 cycles per second in the area where the patterned anvil is located, and wherein the area of each of the formed apertures is generally greater than about 0.05 square millimeters. As a result of this method the thin sheet material and the optional adhesive is apertured in a pattern generally the same as the pattern of raised areas on the patterned anvil, but the liner is not apertured.

In some embodiments it may be desirable to confine the aperturing of the thin sheet material/adhesive composite to a predesignated area or areas of the composite. This result may be obtained where only a portion of the thin sheet is subjected to ultrasonic vibrations. Alternatively, this result may be obtained where only a portion of the patterned anvil is provided with raised areas.

BRIEF DESCRIPTION OF THE DRAWINGS

FIG. 2 is a partial view of the area designated by the dotted circle in FIG. 1.

DEFINITIONS

Figure 1:
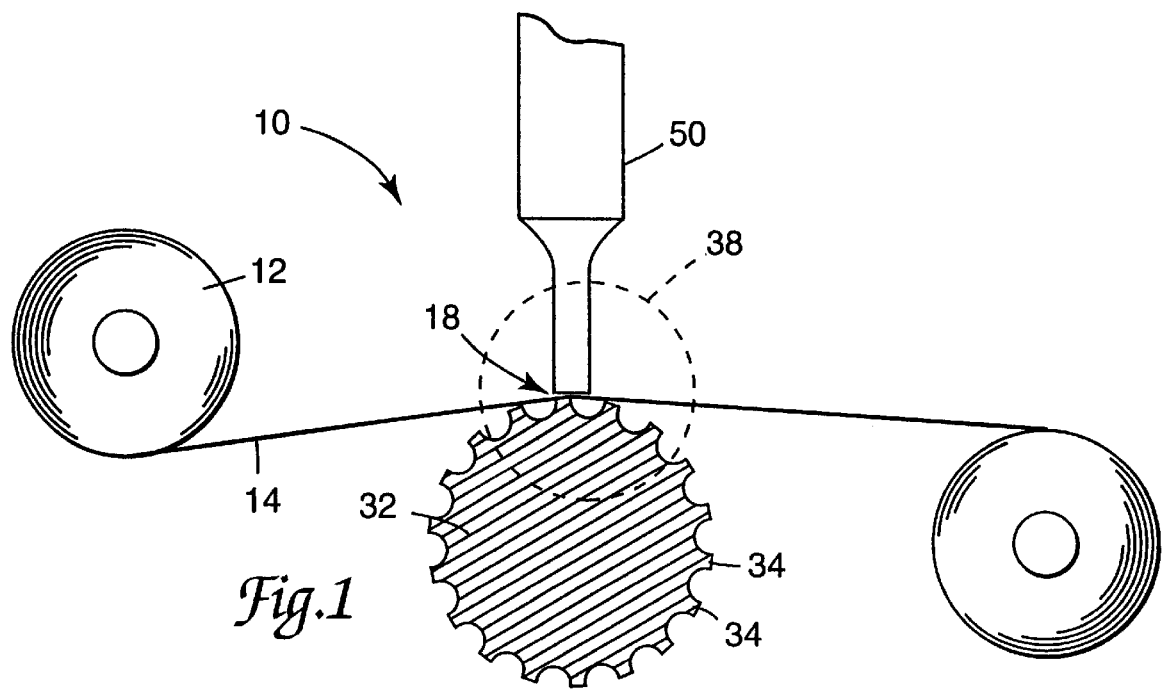
FIG. 1 is a schematic representation of an apparatus which may be utilized to provide sonic vibrations to aperture thin sheet materials.

As used herein the term "adhesive" refers to any pressure sensitive adhesive suitable for spreading over large surface areas such as over continuous sheet materials. Examples of adhesives include but are not limited to acrylates, polyacrylates, polyolefins such as polyalpha olefins, natural and butyl rubbers, polyisoprenes, polyurethanes, block copolymers such as styrene-olefin copolymers, polyethers, and polyesters with or without tackifying ingredients as needed.

As used herein the term "aperture" refers to a generally linear hole or passageway. Aperture is distinguished from and does not include holes or passageways having the greatly tortuous path or passageways found in membranes. The term "aperture" further refers to a hole which has an area of between about 0.05 to about 70 square millimeters. The area of the aperture is measured at the widest point in the linear passageway or hole.

As used herein the term "liner" refers to any material suitable for bonding to the thin sheet material. The liner is generally between about 2 to about 10 mils (0.05 to 0.254 mm) thick and in a preferred embodiment of the present invention is comprised of silicone-coated release paper as commercially available from Daubert of Dixon, Ill.

As used herein the term "thin sheet material" refers to a sheet material having an average thickness generally of greater than about eight (8) mils (0.2 mm). Average thickness is determined by randomly selecting six (6) locations on a given sheet material, measuring the thickness of the sheet material at each location to the nearest 0.1 mil (0.002 mm), and averaging the six values (sum of the six values divided by six). For the purposes of this disclosure, one or more of the above-described sheet materials may be used in combination to comprise a thin sheet material.

As used herein the term "sonic vibration" refers to vibrations having a frequency of at least about 10,000 cycles per second. The term "sonic vibration" includes frequencies commonly referred to in the art as "ultrasonic vibrations" which are known in the art as vibrations in the range from about 20,000 to about 400,000 cycles per second. Since both sonic and ultrasonic vibrations are suitable for the method of the present invention, the terms "sonic" and "ultrasonic" are used interchangeably herein.

As used herein the terms "polymer" or "polymeric" refer to a macromolecule formed by the chemical union of five (5) or more identical combining units called monomers.

As used herein the term "naturally occurring polymeric material" refers to a polymeric material which occurs naturally. The term is also meant to include materials, such as cellophane, which can be regenerated from naturally occurring materials, such as, in the case of cellophane, cellulose. Examples of such naturally occurring polymeric materials include, without limitation, (1) polysaccharides such as starch, cellulose, pectin, seaweed gums (such as agar, etc.), vegetable gums (such as arabic, etc.); (2) polypeptides; (3) hydrocarbons such as rubber and gutta percha (polyisoprene) and (4) regenerated materials such as cellophane or chitosan.

As used herein the term "resilient material" or "resilient wrap" refers to any material which returns substantially to its original shape after being bent, stretched or compressed. Resilient materials include but are not limited to silicone, polyurethane, polyolefin or foam tapes.

As used herein the term "thermoplastic material" refers to a high molecular weight polymer that softens when exposed to heat and returns to its original condition when cooled to room temperature. Natural substances which exhibit this behavior are crude rubber and a number of waxes. Other exemplary thermoplastic materials include, without limitation, polyvinyl chloride, polyesters, nylons, fluorocarbons, linear polyethylene such as linear low density polyethylene, polyurethane prepolymer, polystyrene, polypropylene, polyvinyl alcohol, caprolactams, and cellulosic and acrylic resins and copolymers and blends thereof.

DETAILED DESCRIPTION OF THE INVENTION

Turning now to the figures where like reference numerals represent like structure and, in particular to FIG. 1 which is a schematic representation of an apparatus which can carry out the method of the present invention, the apparatus is generally represented by the reference numeral 10. In operation, a supply roll 12 of a thin sheet material 14 to be apertured is provided. As previously stated, the term thin sheet material refers to sheet materials which have an average thickness of about 8 mils (0.2 mm) or greater. For example, the average thickness of the thin sheet material 14 may range from about 5 to about 250 mils (0.13 to 6.4 mm). More particularly, the average thickness of the thin sheet material 14 may range from about 8 mils to about 120 mils (0.02 to 3.05 mm). Even more specifically, the average thickness of the thin sheet material 14 may range from about 10 mils to about 60 mils (0.254 to 1.5 mm).

The thin sheet material 14 may be formed from a thermoplastic film. The thermoplastic film may be formed from a material selected from the group including one or more polyolefins, polyurethanes, polyesters, A-B-A' block copolymers where A and A' are each a thermoplastic polymer endblock which includes a styrenic moiety and where A may be the same thermoplastic polymer endblock as A', and where B is an elastomeric polymer midblock such as a conjugated diene or a lower alkene or ethylene vinyl acetate copolymer. The polyolefin may be selected from the group including one or more of linear low density polyethylene, polyethylene or polypropylene. The thermoplastic film may be a filled film with the filled film being selected from the group including a polyethylene film filled with starch, titanium dioxide, wax, carbon or calcium carbonate.

In other embodiments the thin sheet material may be a nonwoven web or a foam. Nonwoven webs refer to webs which are formed by hydroentangled spun-bond fibers or melt-blown fibers which may include staple fibers and binder fibers. Nonwoven webs can be made by any conventioanl means known in the art including air layering and carding and direct laid methods such as spin-bonding and melt-blowing. Examples of such methods and nonwoven webs are described in U.S. Pat. No. 3,121,021 and U.S. Pat. No. 3,575,782 both are hereby incorporated by reference. An example of a nonwoven web includes but is not limited to 3M Brand Elastic Nonwoven Tape (9906T) as available from Minnesota Mining and Manufacturing Company of St. Paul, Minn. Foams such as polyvinylchloride, polyethylene and polyurethane are suitable for using as thin sheet materials in the present invention. An example of a suitable foam includes, but is not limited to 3M Brand Foam Tape (1773) as available from Minnesota Mining and Manufacturing Company of St. Paul, Minn.

In even further embodiments the thin sheet material may be a naturally occurring polymeric material. For example, the naturally occurring polymeric material may be selected from the group including cellophane, cellulose acetate, collagen or carrageenan.

Other appropriate thin sheet materials will be apparent to those of skill in the art after review of the present disclosure.

Figure 2:
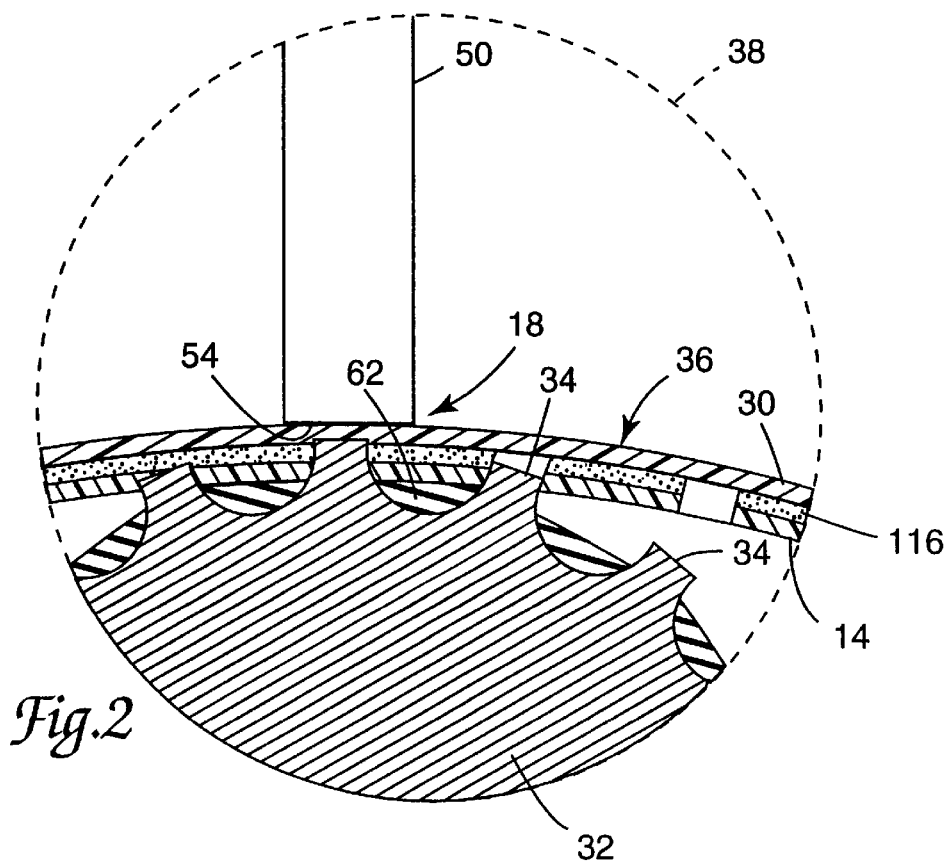
FIG. 2 is a detailed view of the area where the thin sheet material is subjected to sonic vibrations.

In a preferred embodiment, the thin sheet material 14 is coated substantially on one surface with an adhesive 116 as shown best in FIG. 2. The adhesive-coated side of the thin sheet material 14 is preferably fed through the nip 18 created between the ultrasonic horn 50 and the patterned anvil 32 so that the adhesive is placed toward the ultrasonic horn 50. The adhesive 116 is preferably laminated to a release liner 30 in order to reduce friction created between the adhesive 116 and the nip 18 as the thin sheet material 14 is fed through the nip 18.

The preferred pressure sensitive adhesives which can be used on the sheet materials of the present invention are adhesives such as the acrylate copolymers described in U.S. Pat. No. RE 24,906 of Ulrich, the disclosure of which is hereby incorporated by reference particularly an iso-octyl acrylate:acrylic acid copolymer such as the 96:4 copolymer. Also useful are isooctyl acrylate:ethyleneoctyl acrylate:acrylic acid terpolymers, as described in U.S. Pat. No. 4,737,410, the disclosure of which is hereby incorporated by reference. Other useful adhesives are described in U.S. Pat. Nos. 3,389,827, 4,112,213, 4,310,509, and 4,323,557, the disclosures of which are hereby incorporated by reference.

The useful adhesives can also contain tackifiers such as those described in the art, e.g., U.S. Pat. No. 4,737,410.

As previously stated, a liner 30 is adhered to the adhesive coating 116 of the thin sheet material 14 in a preferred embodiment. Together, the thin sheet material 14, the adhesive 116 and the liner are referred to as the composite sheet 36. The liner 30 is preferably comprised of Kraft paper or silicone-coated release paper or some other material which protects the adhesive 116 of the composite sheet 36. The liner 30 also limits the stretch of the composite sheet 36. The present invention operates best when the thin sheet material 14 is not stretched as it is fed through the nip 18. If a liner is not used when feeding the thin sheet material 14/adhesive 116 through the nip, a more elaborate conveying or transport system may be needed to ensure that the thin sheet material 14 is not substantially stretched as the material is forced through the nip 18 and the sonic vibrations impinge upon its surface. One skilled in the art will recognize that it is more difficult to control aperture size if the material subjected to the aperturing process is stretched during the aperturing. Additionally, even if the desired aperture size is obtained, it is difficult to obtain consistent aperture size since aperture size will vary when the substrate is stretched.

In addition to the advantages of reducing stretch of the thin sheet material, the liner 30 provides another advantage in that it helps to reduce wear to the horn 50 and the patterned anvil 32. Since the height of the raised areas 34 or pins on the patterned anvil 32 is such that the raised areas do not aperture the liner 30, the liner 30 always provides a cushion between the patterned anvil 32 and the ultrasonic horn 50 thus limiting wear of the anvil and the horn. The liner 30 further serves as a heat insulator and reduces the friction between the horn 50 and the composite sheet material 36.

In yet another embodiment, the thin sheet material 14 may be laminated directly to a liner 30 and used in the present invention.

In a preferred embodiment the composite sheet material 36 is fed to an area 38 (defined in FIG. 1 by the dotted lined circle) where the composite sheet material 36 is subjected to sonic vibrations. The composite sheet material 36 is fed off of the supply roll 12 directly to a nip 18 formed by the sonic horn 50 and the patterned anvil 32. The patterned anvil 32, in a preferred embodiment, is in the form of a roller which is driven by a conventional power source, not shown. If the patterned anvil 32 is in roll form, it aids in feeding the composite sheet material 36 through the nip 18. This movement helps to reduce stretching of the thin sheet material if a liner is not used in combination with the thin sheet material.

Figure 4:
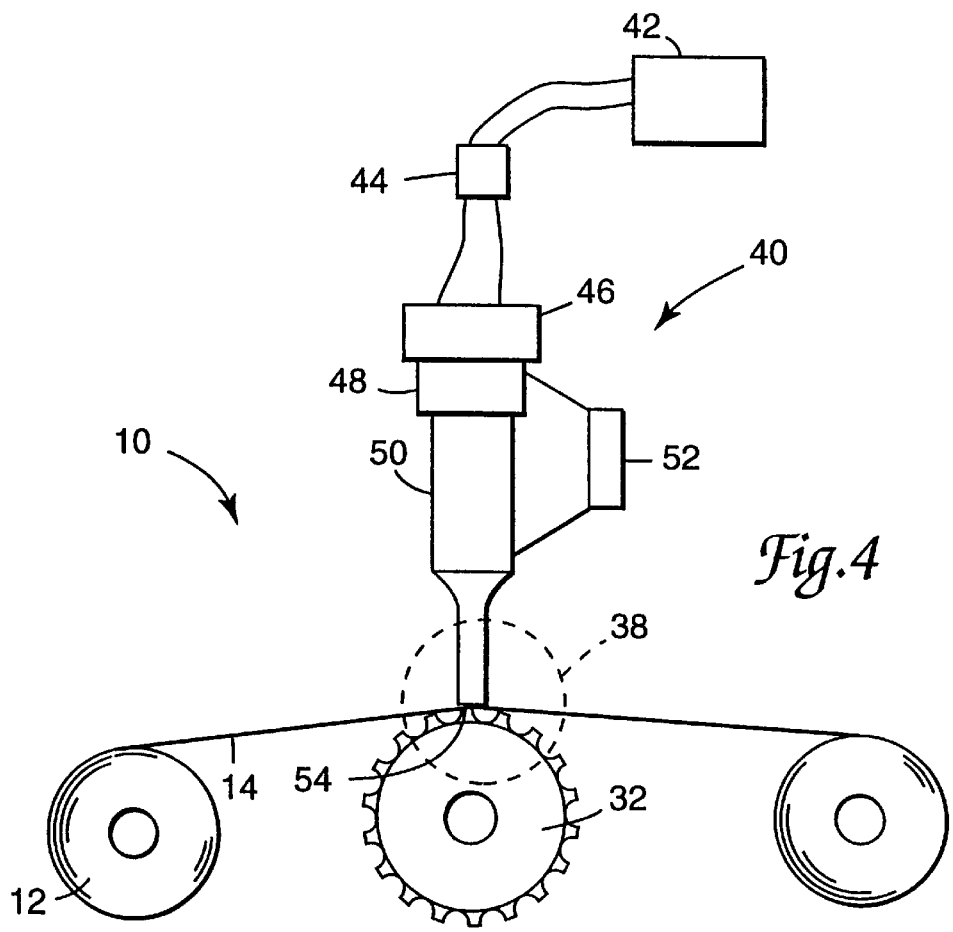
FIG. 4 is a schematic representation of the apparatus of FIG. 1 including further detail of the sonic horn.

The assembly for subjecting the thin sheet material 14 to the sonic vibrations is best shown in FIG. 4 and is generally designated as 40. The assembly 40 includes a power supply 42 which, through a power control 44, supplies power to a piezoelectric transducer 46. As is well known in the art, the piezoelectric transducer 46 transforms electrical energy into mechanical movement as a result of the transducer's vibrating in response to an input of electrical energy. The vibrations created by the piezoelectric transducer 46 are transferred, in conventional manner, to a mechanical movement booster or amplifier 48. As is well known in the art, the mechanical movement booster 48 may be designed to increase the amplitude of the vibrations (mechanical movement) by a known factor depending upon the configuration of the booster 48. In further conventional manner, the mechanical movement (vibrational energy) is transferred from the mechanical movement booster 48 to a conventional bar edge ultrasonic horn 50. It should be realized that other types of ultrasonic horns 50 could be utilized. For example, a rotary type ultrasonic horn could be used. The ultrasonic horn 50 may be designed to effect yet another boost or increase in the amplitude of the mechanical movement (vibrations) which is applied to the thin sheet material 14.

The force applied to the thin sheet material by the ultrasonic horn and patterned anvil prior to engagement of the ultrasonic vibrations is referred to as the "applied force." The applied force is proportional to the pressure placed upon the thin sheet material by the ultrasonic apparatus described above. For purposes of the present invention the "applied force" placed upon the composite sheet material varies over a wide range. Between about 25 p.s.i. up to about 60 p.s.i. (17,500 to 42,000 kg/m$^2$) may be used for a given air cylinder or actuator 52 and still result in acceptable apertures placed in the thin sheet material. By the term "acceptable apertures" it is meant that the apertures are substantially uniform in appearance and of the desired size.

Figure 3:
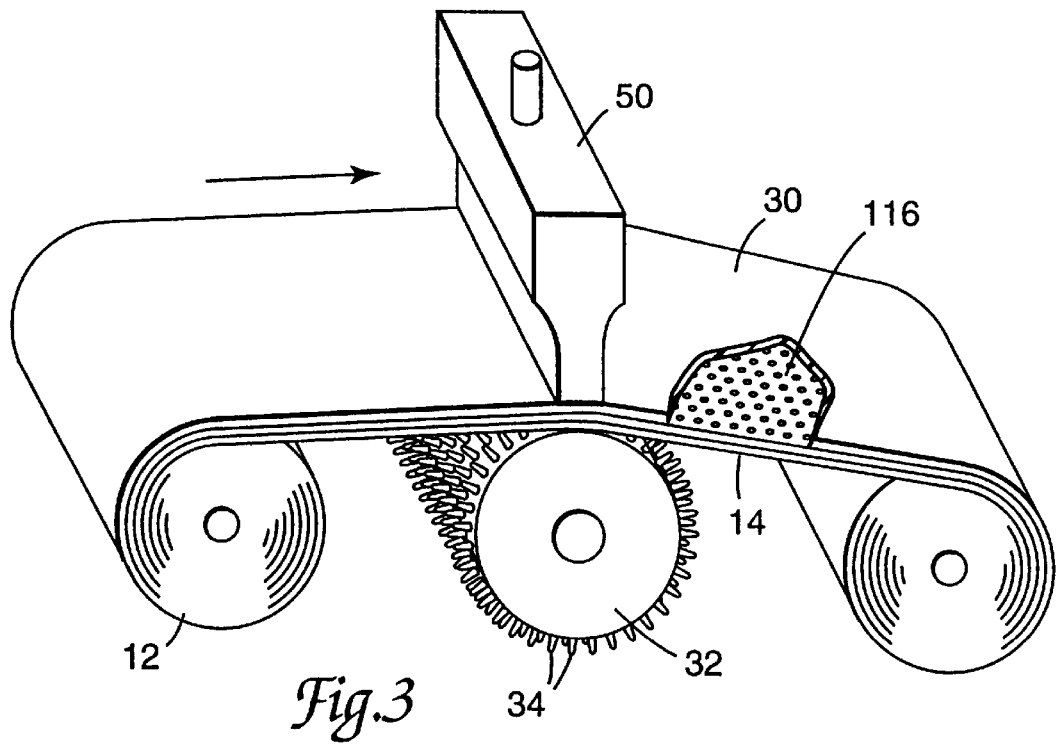
FIG. 3 provides a perspective view of a thin sheet material between a patterned anvil and a sonic horn.

FIG. 3 is a schematic representation of the area 38 shown in FIG. 1 where the sonic vibrations are applied to the composite sheet material 36 (shown in FIG. 1). In a preferred embodiment, the tip 54 (not shown) of the ultrasonic horn 50 is placed nearly tangential to the patterned anvil roller 32. When the ultrasonic vibrations impinge upon the composite sheet material almost perpendicular to the sheet material, the most uniform apertures result. Additionally, this arrangement is preferred because it allows the fastest line speeds of the composite sheet material 36 while still obtaining acceptable apertures.

While the mechanism of action may not be fully understood and the present application should not be bound to any particular theory or mechanism of action, the following is believed to be the mechanism by which the current invention operates. The apertures are formed by localized melting through the thin sheet material 14/adhesive 116 composite in the pattern of the raised areas or pins 34 of the patterned anvil 32. The thin sheet material is not destroyed by the process but instead maintains its integrity. Generally, the number of apertures produced is equal to the number of raised areas 34 on the upper surface of the patterned anvil.

The size of the apertures formed in the thin sheet material 14 and in the adhesive 116 (if an adhesive is added) is dependent upon a number of variable parameters. Changing any one of the following parameters will alter the aperture size which is formed in the thin sheet material 14. The parameters include (1) the construction of the thin sheet material 14, (2) the surface area of the pin 34, (3) the amplitude of the ultrasonic or sonic vibrations, (4) the frequency of the ultrasonic or sonic vibrations, (5) the thermal conductivity of the horn 50 and the patterned anvil 32 and the thin sheet material 14, and (6) the line speed. The pin size, frequency of vibration, amplitude of vibration and the thermal conductivity of the thin sheet material are all directly correlated to the aperture size. That is, as any of these parameters is increased, the resulting aperture size increases. In contrast, the line speed is inversely correlated to the resulting aperture size. That is, as the line speed is increased, the aperture size resulting in the thin sheet material 14 will decrease.

Surprisingly, the pin 34 height on the patterned anvil 32 is equal to or less then the thickness of the material to be apertured. That is, the pin height is equal to or less then the thickness of the thin sheet material 14. If the thin sheet material is coated with an adhesive, the pin 34 height is equal to or less than the height of the thin sheet material 14 and the adhesive 116 combined. The difference in height of the raised areas 34 below the height of the thin sheet material 14 or the thin sheet material 14/adhesive 116 composite varies with the type of thin sheet material 14 to be apertured. A lower pin 34 height may be used to aperture more conformable thin sheet material 14 than may be used for a less conformable thin sheet material 14.

In a preferred embodiment the raised areas 34 on the patterned anvil 32 are generally conical in shape and the resulting apertures in the thin sheet material 14 are therefore frusto-conical in shape. Alternatively the raised areas 34 may be rectangular or pyramidal in shape. In such situations the shape of the aperture will conform generally to the rectangular or pyramidal shape of the raised area 34 of the patterned anvil and the aperture will be generally rectangular or frusto-pyramidal in shape.

Another feature of the present invention is the fact that the apertures can be formed in a predesignated area or areas of the thin sheet material 14. This can be accomplished in a number of ways. For example, the thin sheet material 14 may be subjected to ultrasonic vibrations only at certain areas of the sheet material, thus, aperturing would occur only in those areas. Alternatively, the entire thin sheet material could be subjected to sonic vibrations with the pattern anvil having raised areas only at certain locations and otherwise being flat. Accordingly, the thin sheet material 14 would be apertured only in those areas which corresponded to areas on the patterned anvil having raised areas.

Generally speaking, the area of each of the apertures is usually greater than about 0.05 square millimeters. That is, the area of each of the apertures may range from at least about 0.05 square millimeters to about 70 square millimeters. For example, the area of each of the formed apertures may generally range from at least about 0.05 square millimeters to about 30 square millimeters. More particularly, the area of each of the formed apertures may generally range from at least about 0.05 square millimeters to about 0.5 square millimeters. Even more particularly, the area of each of the formed apertures may generally range from at least about 0.05 square millimeters to about 0.3 square millimeters.

A number of important observations about the process may now be made. For example, the presence of fluid is not important to the present inventive process in order to aperture the thin sheet material. Additionally, it is not necessary to apply tension to the thin sheet material 14 in order to form the apertures in the thin sheet material 14. Any tension which is placed upon the thin sheet material 14 during the method of the present invention is necessary only for good tracking and handling of the thin sheet material 14. The pressure between the ultrasonic horn 50 and the patterned anvil 32 is supplied by the combination of the applied force described above and the ultrasonic vibrations. One additional and surprising feature of the invention is that the method of the present invention forms apertures in adhesive-coated thin sheet materials. Since it is believed that the apertures are melted into the thin sheet material and into the adhesive, one would expect a viscous material such as an adhesive to flow back into the aperture thus eliminating the aperture. However, this does not occur and the invention is surprisingly suited for aperturing adhesive-coated thin sheet materials.

Different constructions of the patterned anvil 32 are also anticipated for use with the present invention. For example, the patterned anvil 32 could be a flat plate with raised portions acting to direct the aperturing force of the sonic horn 50. Preferably the patterned anvil 32 is a cylindrical roller having raised areas 32. If the patterned anvil is a cylindrical roller with raised areas, it is desirable to wrap or coat the patterned anvil 32 with a resilient material. Examples of suitable resilient materials include silicone, polyurethane, polyolefin or foam tape. The addition of the resilient material seems to allow a greater variability of pin 34 height which results in acceptable aperture size and depth. Additionally, if a liner 30 is used in the method of the present invention and a resilient material is added to the patterned anvil 32, a greater range of pin 34 height is acceptable to obtain an apertured thin sheet material 14 and an unapertured liner 30.

The invention will now be discussed with regard to specific examples which will aid those of skill in the art in a full and complete understanding thereof. The following examples demonstrate different processing conditions and materials suitable for use in the present invention. The following are only intended as exemplary and are not intended to limit the invention.

EXAMPLES

Ultrasonic Welder

A 400 series Branson ultrasonic welding apparatus (available commercially from Branson Ultrasonics Corp., Danbury, Conn.) shown schematically in FIG. 4 using a 6.35 cm air cylinder comprising a 1.27 cm by 15.24 cm titanium horn with a 2 to 1 booster was used to supply the sonic vibration in each of the examples below. The ultrasonic horn was run so that it supplied vibrations at about 20,000 cycles per second in each of the examples.

Example 1

This example demonstrates different line speeds and applied forces are suitable for aperturing a polyurethane nonwoven web according to the present invention.

A 2.54 cm wide rotary anvil of about 7.62 cm diameter covered with 0.508 by 0.508 mm and 1.4 mm high square pins separated by 1.27 mm on center was used in accordance with the ultrasonic welder described above to form a systematic pattern of apertures in a thin sheet material provided from a supply roll. The pattern provides apertures in the thin sheet material in rows 1.27 mm apart (center to center) in the machine direction and rows 1.27 mm apart in the cross machine direction. The apertures are staggered.

The composite sheet material for aperturing consisted of a liner of about 0.0762 mm kraft silicone-coated release paper 1-80BKG-157 and PE (Daubert Chemical Co., Dixon, Ill.) over a coated layer of 6 grains (25 g/m$^2$) of acrylate adhesive (60% of 94:6 isooctyl acrylate:acrylic acid and 40% of Foral 85 tackifier (available from Hercules Corp., Wilmington, Del.)) on a layer of melt blown nonwoven web made from commercially available polyurethane (Morthane PS440-200;Morton International, Inc.) of basis weight 143.5 g/m$^2$.

The composite sheet material was driven at various speeds through a nip created by the ultrasonic welder and the patterned anvil to aperture the thin sheet materials. The ultrasonic welder had a sonic amplitude of about 3 mil (0.0762 cm) with varying amounts of force applied to the composite sheet material as shown in Table 1. The results are shown in Table 1 below.

TABLE 1

| COMPOSITE SHEET MATERIAL/RUN NUMBER | LINE SPEED (m./min) | FORCE APPLIED (dial pressure in kg/m$^2$) | DESCRIPTION OF APERTURES PRODUCED | APERTURE SIZE (estimated in mm$^2$) |
|---|---|---|---|---|
| 1. Polyurethane, Adhesive & Liner | 6.1 | 4570 | Thin sheet material embossed, some apertures formed | 0.16 |
| 2. Polyurethane, Adhesive & Liner | 12.2 | 7031 | Thin sheet material embossed, some apertures formed | 0.16 |
| 3. Polyurethane, Adhesive & Liner | 21.3 | 10547 | Thin sheet material embossed, some apertures formed | 0.16 |
| 4. Polyurethane, Adhesive & Liner | 30.5 | 14062 | Thin sheet material embossed, some apertures formed | 0.16 |
| 5. Polyurethane, Adhesive & Liner with PET Carrier* | 30.5 | 14062 | Apertures formed in thin sheet material and adhesive | 0.16 |
| 6. Polyurethane, Adhesive & Liner | 6.1 | 7031 | Thin sheet material embossed, more apertures formed than in run 1. | 0.16 |
| 7. Polyurethane, Adhesive & Liner | 6.1 | 5625 | Thin sheet material embossed and some apertures formed, but fewer than in run 1. | 0.16 |

*a layer of polyethylene terephthalate, 0.036 mm was used as a carrier layer between the anvil and the polyurethane layer Example 2

This example illustrates that the method of the present invention works with or without a resilient material placed on the patterned anvil.

The composite sheet material for aperturing consisted of a liner of about 0.0762 mm kraft silicone-coated release paper 1-80BKG-157 and PE (Daubert Chemical Co., Dixon, Ill.) over a coated layer of 6 grains (25 g/m$^2$) of acrylate adhesive (60% of 94:6 isooctyl acrylate:acrylic acid and 40% Foral 85 tackifier) on a layer of melt blown nonwoven web made from commercially available polyurethane (Morthane PS440-200; Morton International, Inc.) of basis weight 143.5 g/m$^2$. The thickness of the melt-blown web and adhesive together was 0.343 mm.

A 9.52 cm wide rotary anvil of about 7.62 cm diameter covered with a pattern of 1.016 mm diameter and 0.381 mm high cylindrical pins separated by 4.61 mm on center was provided. For the first run the patterned anvil was covered with a 0.373 mm thick layer of the melt blown polyurethane web with adhesive with the liner removed and the adhesive adhered to the anvil. This served as a resilient coating on the anvil. The patterned anvil was used to form a systematic pattern of apertures in a thin sheet material/adhesive provided from a supply roll.

The composite sheet material described above was driven at a speed of 30.5 m/min through the nip created by the ultrasonic welder and the patterned anvil. The ultrasonic welder had a sonic amplitude of about 0.0762 mm and varying amounts of force were applied to the composite sheet material as shown in Table 2. The apertures which resulted are described in Table 2.

TABLE 2

| COMPOSITE SHEET MATERIAL | RESILIENT WRAP | APPLIED FORCE (dial pressure in kg/m$^2$) | APERTURE SIZE (estimated in mm$^2$) | DESCRIPTION OF APERTURES PRODUCED |
|---|---|---|---|---|
| 1. Polyurethane, Adhesive & Liner | yes | 26,015 | 0.28 | thin sheet material and adhesive was perforated; liner unperforated |
| 2. Polyurethane, Adhesive & Liner | no | 26,105 | 0.28 | thin sheet material and adhesive perforated and liner partially perforated |
| 3. Polyurethane, Adhesive & Liner | no | 21,093 | 0.28 | thin sheet material and adhesive perforated and liner partially perforated |
| 4. Polyurethane, Adhesive & Liner | no | 17,578 | 0.28 | thin sheet material and adhesive perforated; liner embossed |
| 5. Polyurethane, Adhesive & Liner | no | 14,062 | 0.28 | 30% of the thin sheet material and adhesive was perforated; 70% of the thin sheet material was embossed; liner embossed |

The thin sheet material of Example 2, under the conditions of run 4 is preferred.

Example 3

This example demonstrates that thin sheet materials with different constructions may be apertured according to the present invention. Additionally, the example illustrates that different materials may be used as the resilient wrap for the patterned anvil.

The composite sheet material of runs 1–5 and 8 consisted of a liner of about 0.0762 mm kraft silicone coated release paper 1-80BKG-157 and PE (Daubert Chemical Co., Dixon, Ill.) over a layer of 6 grains (25 g/m$^2$) of acrylate adhesive. (60% of 94:6 isooctyl acrylate:acrylic acid and 40% Foral 85 tackifier) on a layer of melt blown nonwoven web (thin sheet material) made from commercially available polyurethane (Morthane PS440-200; Morton International, Inc.) of basis weight 143.5 g/m$^2$. The thickness of the melt-blown thin sheet material and adhesive together was 0.343 mm.

The composite sheet material of run 7 consisted of a Microfoam™ Tape with liner available as medical tape 9997L from 3M Company of St. Paul, Minn. The composite sheet material of run 7 consisted of Volara™ Foam tape with liner available from 3M Company of St. Paul, Minn. The Volara™ Foam backing was 0.89 mm thick and the liner was 0.178 mm thick.

A 9.52 cm wide rotary anvil of about 7.62 cm diameter covered with 1.016 mm diameter and 0.381 mm high cylindrical pins separated by 4.61 mm on center was covered with various resilient wraps described in Table 3. The effective pin height is defined as the height of the pin on the rotary anvil less the thickness of the resilient wrap and is given in Table 3 for each resilient wrap.

The composite sheet was driven at a line speed of 30.5 m/min through the nip created by the ultrasonic welder and the patterned anvil. The ultrasonic welder had a sonic amplitude of about 0.0762 mm and varying amounts of force were applied to the composite sheet material as shown in Table 3 to provide apertures in the thin sheet materials. The applied force was regulated by a dial regulator on the apparatus.

TABLE 3

| Composite Sheet Material | Resilient Wrap | Pin Height (mm) | Effective Pin Height (mm) | Applied Force (kg/m$^2$) | Description of Apertures Produced | Size of Apertures (estimated in mm$^2$) |
|---|---|---|---|---|---|---|
| 1. Polyurethane, Adhesive & Liner | 0.102 mm (polyvinyl chloride) plastic film tape no. 471 (3M Company) | 0.381 | 0.0279 | 25312 to 29530 | good perforation of polyurethane and adhesive; embossed liner | 0.3 |
| 2. Polyurethane, Adhesive & Liner | 0.203 mm (polyvinyl chloride) plastic film tape no. 471 (3M Company) | 0.381 | 0.178 | 25312 | embossing of polyurethane, some apertures formed in the polyurethane and adhesive | 0.3 |
| 3. Polyurethane, Adhesive & Liner | 0.203 mm (polyvinyl chloride) plastic film tape no. 471 (3M Company) | 0.381 | 0.178 | 29530 | embossing of polyurethane, some apertures formed in the polyurethane and adhesive | 0.3 |
| 4. Polyurethane, Adhesive & Liner | 0.152 mm machine grade stretch film (polyethylene) available from Polar Plastic, | 0.381 | 0.229 | 23905 | good perforation of polyurethane and adhesive; embossed liner | 0.3 |

TABLE 3-continued

| Composite Sheet Material | Resilient Wrap | Pin Height (mm) | Effective Pin Height (mm) | Applied Force (kg/m$^2$) | Description of Apertures Produced | Size of Apertures (estimated in mm$^2$) |
|---|---|---|---|---|---|---|
| 5. Polyurethane, Adhesive & Liner | North St. Paul, MN 0.140 mm polyester tape no. 351 (3M Company) | 0.381 | 0.241 | 26718, 30936, 35155 and 39374 | fair to good perforation of polyurethane and adhesive; some embossing of liner | 0.3 |
| 6. Microfoam ™ Tape with liner | none | 0.381 | 0.381 | 28124 to 31640 | good perforation of polyurethane and adhesive; some embossing of liner | 0.08 |
| 7. Volara ™ Foam Tape (0.89 mm) with 0.178 mm liner | none | 0.381 | 0.381 | 14062 | good perforation of polyurethane and adhesive; some embossing of liner | 0.38 |
| 8. Polyurethane, Adhesive & Liner | 0.889 mm Volara foam tape with liner removed | 0.381 | zero | 31640 | good perforation of polyurethane and adhesive; some embossing of liner | 0.3 |

It should be understood that the detailed description of the presently preferred embodiments of the present invention is given only by way of illustration because various changes and modifications well within the spirit and scope of the invention will become apparent to those of skill in the art in view of this detailed description.

We claim:

1. A method of forming apertures in a sheet material having a first side and a second side, the method comprising the steps of:
    (a) placing the sheet material under no more tension than required for good tracking and handling on a patterned anvil having a pattern of flattened raised areas wherein the height of the flattened raised areas is equal to or less than the thickness of the sheet material; and
    (b) subjecting the sheet material to a sufficient amount of sonic vibrations to aperture the sheet material;
    whereby the sheet material is apertured in a pattern generally the same as the pattern of raised areas on the patterned anvil.

2. The method of claim 1 wherein the step of subjecting the sheet material to sonic vibrations occurs in the absence of a liquid.

3. The method of claim 1 wherein the area of each of the formed apertures is generally greater than about 0.05 square millimeter.

4. The method of claim 1 wherein the sheet material is a nonwoven or foam sheet material.

5. The method of claim 1 wherein the sheet material is a film.

6. The method of claim 1 wherein the area of each of the formed apertures is no greater than about 70 square millimeters.

7. The method of claim 1 wherein the patterned anvil is a cylindrical roller with flattened raised areas having a shape selected from the group consisting of conical, rectangular, pyramidal, cylindrical, square, and combinations thereof.

8. The method of claim 1 wherein at sheet material is elastic.

9. The method of claim 1 wherein the sheet material comprises a thermoplastic material.

10. The method of claim 9 wherein the thermoplastic sheet material comprises polyurethane.

11. The method of claim 1 wherein at least one side of the sheet material is substantially coated with adhesive.

12. The method of claim 11 wherein the adhesive is selected from the group consisting essentially of acrylic adhesives.

13. The method of claim 11 wherein the sheet material is in planar juxtaposition with a liner.

14. The method of claim 13 wherein the liner is comprised of silicone coated release paper.

15. The method of claim 1 wherein the sonic vibrations are in the range from about 15,000 to about 40,000 cycles per second.

16. A method of forming apertures in a sheet material having a first side and a second side, the method comprising the steps of:
    (a) placing the sheet material on a patterned anvil having a pattern of flattened raised areas wherein the height of the flattened raised areas is equal to or less than the thickness of the sheet material; and
    (b) subjecting the sheet material to a sufficient amount of sonic vibrations to aperture the sheet material in the absence of a liquid;
    whereby the sheet material is apertured in a pattern generally the same as the pattern of raised areas on the patterned anvil.

17. The method of claim 16 wherein the area of each of the formed apertures is generally greater than about 0.05 square millimeter.

18. The method of claim 16 wherein the sheet material is a nonwoven or foam sheet material.

19. The method of claim 16 wherein the sheet material is a film.

20. The method of claim 16 wherein the patterned anvil is a cylindrical roller with flattened raised areas having a shape selected from the group consisting of conical, rectangular, pyramidal, cylindrical, square, and combinations thereof.

21. A method of forming apertures in a thin sheet material having a first side and a second side wherein at least one side of the thin sheet material is substantially coated with an adhesive and further wherein the area of each of the formed apertures is generally greater than about 0.05 square millimeters, the method comprising the steps of:
    (a) placing the adhesive-coated thin sheet material on a patterned anvil having a pattern of raised areas wherein the height of the flattened raised areas is equal to or less than the thickness of the thin sheet material and the adhesive; and (b) subjecting the thin sheet material to a sufficient amount of sonic vibrations to aperture the thin sheet material and the adhesive; and whereby the thin sheet material and the adhesive is apertured in a pattern generally the same as the pattern of raised areas on the patterned anvil.

22. The method of claim 21 wherein the thin sheet material comprises a nonwoven web.

23. The method of claim 21 wherein the thin sheet material comprises a foam.

24. The method of claim 21 wherein the thin sheet material comprises a film.

25. The method of claim 21 wherein the adhesive is selected from the group consisting essentially of acrylic adhesives.

26. The method of claim 21 wherein the patterned anvil is a cylindrical roller with raised areas.

27. The method of claim 21 wherein the thin sheet material is at least 8 mils (0.2 mm) thick.

28. The method of claim 21 wherein the sonic vibrations are in the range from about 15,000 to about 40,000 cycles per second.

29. A method of forming apertures in a thin sheet material having a first surface and a second surface wherein at least one surface of the thin sheet material is in planar juxtaposition with a liner and an adhesive is optionally coated on the thin sheet material, the thin sheet material and the optional adhesive and the liner together comprising a composite sheet material and further wherein the area of each of the formed apertures is generally greater than about 0.05 square millimeters, the method comprising the steps of:

(a) placing the composite sheet material on a patterned anvil having a pattern of raised areas wherein the height of the raised areas is less than or equal to the thickness of the thin sheet material and the optional adhesive; and (b) subjecting the composite sheet material to a sufficient amount of sonic vibrations to aperture the thin sheet material and the optional adhesive; and whereby the thin sheet material and the optional adhesive is apertured in a pattern generally the same as the pattern of raised areas on the patterned anvil, but the liner is not apertured.

30. The method of claim 29 wherein the liner is comprised of silicone coated release paper.

31. The method of claim 29 wherein the thin sheet material comprises a nonwoven web.

32. The method of claim 29 wherein the thin sheet material comprises a foam.

33. The method of claim 29 wherein the thin sheet material comprises a film.

34. The method of claim 29 wherein the adhesive is selected from the group consisting essentially of acrylic adhesives.

35. The method of claim 29 wherein the patterned anvil is a cylindrical roller with raised areas.

36. The method of claim 29 wherein the thin sheet material is at least 8 mils (0.2 mm) thick.

37. The method of claim 29 wherein the sonic vibrations are in the range from about 15,000 to about 40,000 cycles per second.

38. A method of forming apertures in a thin sheet material having a first surface and a second surface wherein at least one surface of the thin sheet material is in planar juxtaposition with a liner and an adhesive is coated on at least one surface of the thin sheet material, the thin sheet material and the adhesive and the liner together comprising a composite sheet material and further wherein the area of each of the formed apertures is generally greater than about 0.05 square millimeters, the method comprising the steps of:

(a) placing the composite sheet material on a patterned anvil having a pattern of raised areas wherein the height of the raised areas is less than or equal to the thickness of the thin sheet material and the adhesive;

(b) subjecting the composite sheet material to a sufficient amount of sonic vibrations in the absence of liquid to aperture the thin sheet material and the adhesive but not aperture the liner; and whereby the thin sheet material and the adhesive is apertured in a pattern generally the same as the pattern of raised areas on the patterned anvil but the liner is not apertured.

* * * * *